United States Patent [19]
Hayashi

[11] Patent Number: 5,978,428
[45] Date of Patent: Nov. 2, 1999

[54] APPARATUS AND METHOD FOR ESTIMATING A VARIABLE DATA RATE

[75] Inventor: Hiroshi Hayashi, Tokyo, Japan

[73] Assignee: Oki Electric Industry Co., Ltd., Tokyo, Japan

[21] Appl. No.: 08/701,481

[22] Filed: Aug. 22, 1996

[30] Foreign Application Priority Data

Aug. 23, 1995 [JP] Japan ................................. 7-214518
Oct. 19, 1995 [JP] Japan ................................. 7-271095

[51] Int. Cl.⁶ .............................. H04B 1/66; H04L 27/06
[52] U.S. Cl. ........................................ 375/377; 375/316
[58] Field of Search ................................. 375/377, 222, 375/295, 225, 227, 316

[56] References Cited

U.S. PATENT DOCUMENTS

| | | | |
|---|---|---|---|
| 4,887,280 | 12/1989 | Reisenfeld | 375/377 |
| 4,991,184 | 2/1991 | Hashimoto | 375/222 |
| 5,541,955 | 7/1996 | Jacobsmeyer | 375/222 |
| 5,619,524 | 4/1997 | Ling et al. | 275/377 |

FOREIGN PATENT DOCUMENTS

| | | |
|---|---|---|
| 0 713 305 A1 | 5/1996 | European Pat. Off. . |
| WO 94/29980 A1 | 12/1994 | WIPO . |
| WO 95/01032 | 1/1995 | WIPO . |

*Primary Examiner*—Tesfaldet Bocure
*Attorney, Agent, or Firm*—Rabin & Champagne, P.C.

[57] ABSTRACT

A digital communication system is disclosed. A transmitter combines a digitized signal into a digital data stream with variable data rate and transmits it to a receiver. The receiver decodes the received signal with an actually transmitted data rate. For this reason, the receiver has to estimate the coding data rate of the received signal. The receiver decodes the received signal at one decoding rate, which is evaluated whether the decoding rate is correct or not. Such evaluation is achieved by, for example, measuring S/N ratio. According to such estimation the receiver estimates the actual transmitted data rate.

3 Claims, 17 Drawing Sheets

| data rate | 1 | 1/2 | 1/4 | 1/8 |
|---|---|---|---|---|
| p6 | (1/2) p5 | p5 | p5 | p5 |
| p7 | (1/4) p5 | (1/2) p5 | p5 | p5 |
| p8 | (1/8) p5 | (1/4) p5 | (1/2) p5 | p5 |

APPARATUS AND METHOD FOR ESTIMATING A VARIABLE DATA RATE

FIELD OF THE INVENTION

This invention relates to a method of estimating the data rate of a data stream in a variable data rate communications system and to receiver apparatus for a digital communications system for receiving data at variable data rates.

BACKGROUND OF THE INVENTION

With the increase in subscribers to portable telephone services, effective use has become a greater problem than that of frequency. One technique for solving this problem is CDMA (Code Division Multiple Access). CDMA cellular phone systems adhere to TIA/EIA/IS-95.

In CDMA communication systems, four rates are obtained for use as the data rate for transmitting information bits. Namely, the four data rates of 8.6 kbps, 4.0 kbps, 2.0 kbps and 0.8 kbps are used. Actually, information bits are transmitted using a specified one of the four data rates. The information bits to be transmitted are divided into one frame every 20 msec, and are transmitted every frame. As a result, with the above mentioned four data rate, 172 bits, 80 bits, 40 bits or 16 bits are respectively included in one frame. Among the four data rates, 12 CRC bits and 8 CRC bits are respectively added to the information bit frames of 8.6 kbps and 4.0 kbps. CRC bits are not added to the information bit frames of 2.0 kbps and 0.8 kbps. 8 tail bits are then added to the frames of each data rate. At this time, the data rates respectively become 9.6 kbps, 4.8 kbps, 2.4 kbps and 1.2 kbps. Next, coding is carried out to cut the rate in half. After this, the data rate of each of the information bits is made uniform at 19.2 kbps by repeating the same symbol twice in the case of a data rate of 4.8 kbps, 4 times in the case of a data rate of 2.4 kbps, and 8 times in the case of a data rate of 1.2 kbps. The information bits that have thus had the data rates made uniform are next interleaved, and then scrambled using a long code PN sequence. A power control bit is also embedded in the information bits that have been scrambled. With CDMA transmission systems, 384 symbols are included in one frame. One frame is split into 16 power control groups (referred to hereinafter as PCG). Accordingly, 24 symbols are included in one PCG. Within the 24 symbols of each PCG, power control bits of 2 symbols are arranged at random positions as power control information to be transmitted to a mobile station by a base station. At this time, the symbols that were originally in those positions are lost. The position at which the power control bits are arranged is inside the 2 symbol power control bits, and is defined as a header symbol position. This position is based on 4 bits extracted from the aforementioned long code PN sequence, and 16 positions are obtained. Because one power control group is comprised of 24 symbols, the power control bits are arranged from the header to the 17th symbol, and are not arranged in the symbols from the 18th to the 24th. As a result, the information bits in which the power control bits are embedded are scattered by a Walsh function and a pilot long code PN sequence, then QPSK modulated and transmitted to a mobile station.

The signal transmitted from the base station is received at the mobile station. This received signal is QPSK demodulated, then reverse scattered by a Walsh function and pilot long code PN sequence. The power control bits are also extracted. '0' is inserted at the positions from which the power control bits have been extracted, to indicate that there is no information. As a result, a 19.2 kbps received symbol code sequence is obtained. Next, this received symbol code sequence is decoded and a CRC check is carried out. The received signal is a reduction encoded signal, decoding is carried out using, for example, Viterbi decoding. At first, the data rate of the received signal cannot be determined at the mobile station. Because of this, it is necessary to estimate the data rate. That is, there is a need to promptly estimate the data rate of the actually transmitted signal from the four possible data rates.

SUMMARY OF THE INVENTION

The present invention accordingly provides receiver apparatus for a digital communications system for receiving data at variable data rates comprising a digital demodulator configured to demodulate a received digital data stream, a data rate estimator configured to estimate the data rate of the received digital data stream, and a convolutional decoder configured to decode the demodulated digital data stream, wherein the data rate estimator comprises accumulator means configured to provide at least one band restriction signal, power measuring means configured to measure the average power of the band restriction signal, and data rate estimating means configured to determine the data rate of the received digital data stream according to the measured average power.

The invention further comprises a method of estimating the data rate of a data stream in a variable data rate communications system, comprising the steps of receiving a digital data stream, generating at least one band restriction signal from the received data stream, measuring the average power of the band restriction signal, and estimating the data rate according to the average power.

The invention also comprises a transmission data rate estimating apparatus comprising accumulator means configured to provide at least one band restriction signal, power measuring means configured to measure the average power of the band restriction signal, and data rate estimating means configured to determine a transmission data rate according to the measured average power.

BRIEF DESCRIPTION OF THE DRAWINGS

Embodiments of the invention will now be described by way of example with reference to the accompanying drawings, in which:

FIG. 4 is a diagram showing the relationship between the data rate and power sequence.

FIG. 8 is a diagram showing one frame of a received signal in a CDMA system.

DESCRIPTION OF THE PREFERRED EMBODIMENT

Figure 1:
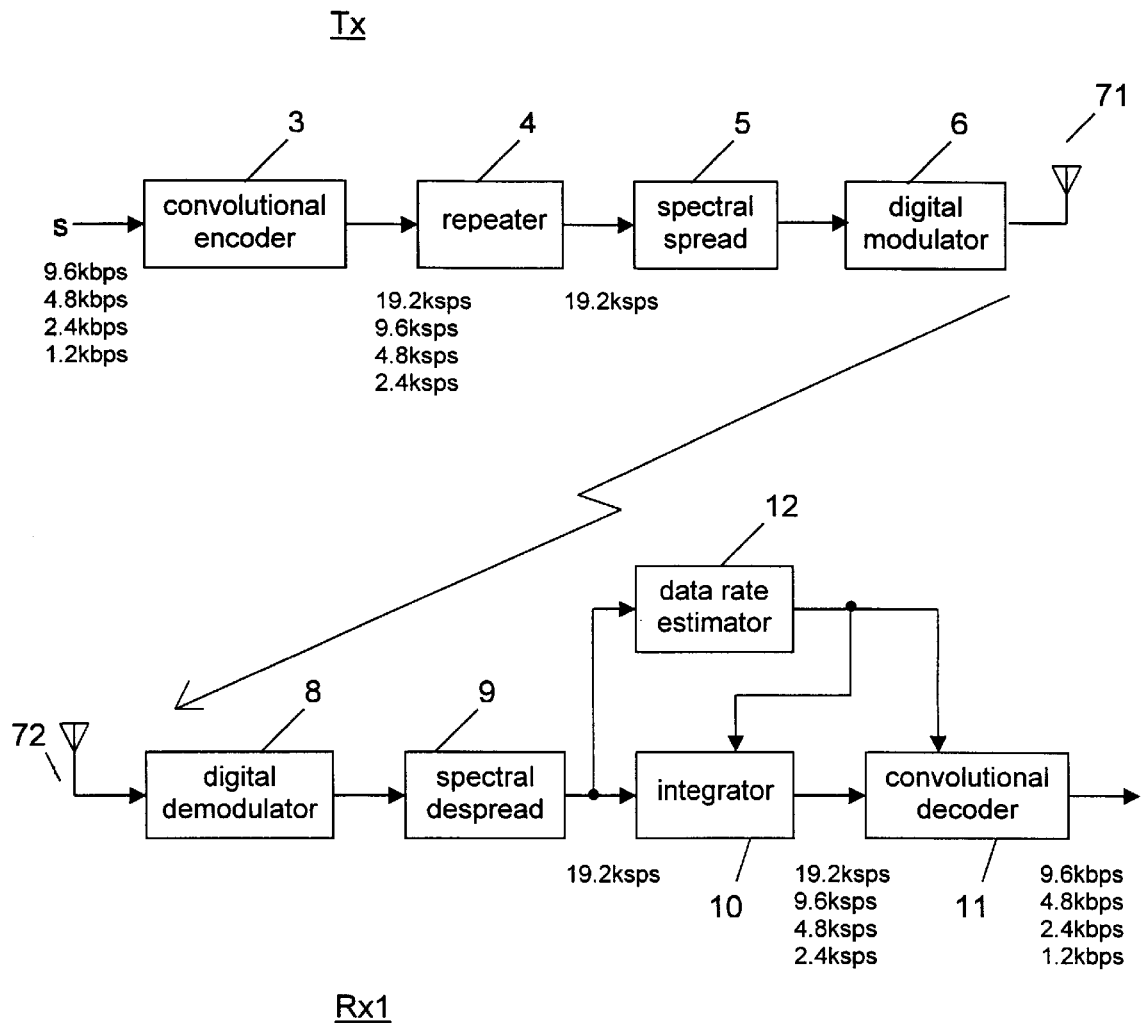
FIG. 1 shows a CDMA communication system of the present invention.

A CDMA communication system of the present invention is shown in FIG. 1. This system is comprised of a transmitter Tx and a receiver Rx. In this system, as previously mentioned, 4 data rates of 8.6 kbps, 4.0 kbps, 2.0 kbps and 0.8 kbps are used. The data rates are then made 9.6 kbps, 4.8 kbps, 2.4 kbps and 1.2 kbps by adding CRC and tail bits. A transmission signal S generated in this way is input to a convolutional encoder 3. The convolutional encoder 3 convolution encodes the transmission signal S with a half coding rate, thus the data rates are respectively doubled to 19.2 kbps, 9.6 kbps, 4.8 kbps and 2.4 kbps. The convolution encoded transmission signal S is input to a repeater 4.

In the repeater 4, the data rates are unified to 19.2 kbps. Namely, when the data rate of the input information bits is 8.6 kbps, the repeater 4 does not carry out its repeat operation. However, the same symbol is repeated and output twice when the data rate is 4 kbps, 4 times when the data rate is 2.0 kbps, and 8 times when the data rate is 0.8 kbps, and outputs. This output is scrambled using a long code PN sequence after being interleaved. Power control bits are then embedded.

The output of the repeater 4 is supplied to a spectral spreader 5. The spectral spreader 5 spectrally spreads the transmission signal and supplies it to a digital modulator 6. The digital modulator 6 QPSK (Quadrature Phase Shift Keying) modulates the supplied signal. The modulated signal is then transmitted from an antenna 71.

A receiver Rx1 receives a signal that has arrived from the transmitter Tx, through the antenna 72. The receive signal received by the antenna 72 is input to a digital demodulator 8 where it is QPSK demodulated. This receive signal is input to a spectral despreader 9 where the receive signal is despread. Next, the signal is despread using a long code PN sequence, and deinterleaved. In this way, the receive symbols are obtained.

The receive symbols are input to an integrator 10, and are also input at the same time to a data rate estimator 12. The data rate is estimated by the data rate estimator 12, nd processing is carried out by the integrator 10 and the convolutional decoder 11 based on this data rate. That is, receive symbols at a data rate of 19.2 kbps supplied from the spectral despreader 9 are integrated by the integrator 10 based on the estimated data rate.

Next, the convolutional decoder 11 decodes an information bit sequence based on symbols integrated by the integrator 10. The length of this information bit sequence is based on the estimated data rate from the data rate estimator 12. In the decoding carried out by the convolutional decoder 11 a Viterbi decoding method or the like is used. CRC bits are also carried out by the convolutional decoder 11. When interleaving is being carried out by the transmitter Tx, de-interleaving is carried out after back diffusion by the despreader 9.

Processing carried out by the integrator 10 will be explained below. The integrator 10 integrates symbols repeated by the transmitter, and provides a symbol sequence, having a length depending on the data rate estimated by the data rate estimator 12, to the convolutional decoder 11. Concretely, processing is carried out as in the following equation. When the estimated data rate is ½, the output s(n) of the integrator 10 is represented by equation 1.

$$s(n) = \sum_{i=1}^{2} X(2n + i - 2) \quad (n = 1 \ldots N/2) \quad (1)$$

Similarly, when the data rate is ¼ or ⅛, the output is respectively represented by equations (2) and (3).

$$s(n) = \sum_{i=1}^{4} X(4n + i - 4) \quad (n = 1 \ldots N/4) \quad (2)$$

$$s(n) = \sum_{i=1}^{8} X(8n + i - 8) \quad (n = 1 \ldots N/8) \quad (3)$$

When the data rate is 1, the integrator 10 does not carry out any processing.

Figure 2:
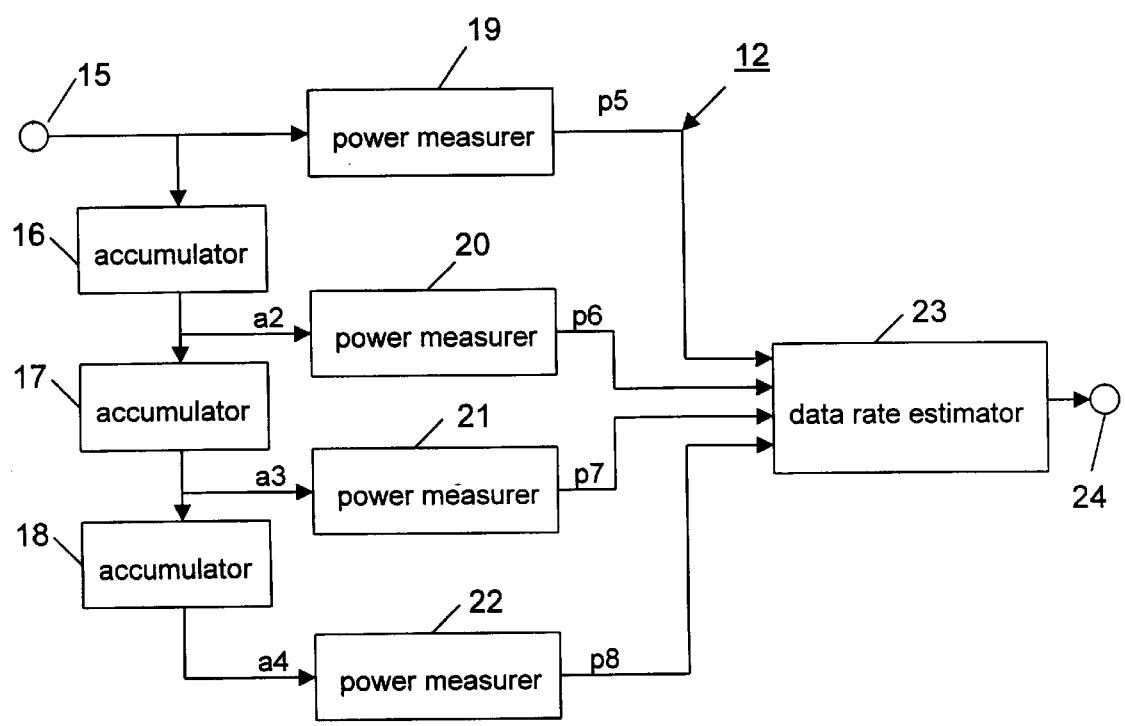
FIG. 2 is a block diagram showing the configuration of a data rate estimator.

Next, the detailed construction and operation of the data rate estimator 12 will be explained using FIG. 2. The receive symbol output from the spectral despreader 9 is supplied from a terminal 15. These receive symbols are supplied to a first receive power measurer 19, and at the same time supplied to a first accumulator 16. The output of the first accumulator 16 is supplied to a second power measurer 20 and a second accumulator 17. The output of the second accumulator 17 is supplied to a third power measurer 21 and third accumulator 18. The output of the third accumulator 18 is supplied to a fourth power measurer 22. Each of the accumulators are connected in series. As a result, the accumulators limit bands of receive sample values to implement a number of band restriction signals. Also, each of the power measurers obtain the average power of the output signals of the respective accumulators. The outputs of the power measurers are supplied to a data rate estimator 23. The data rate estimator 23 estimates the data rate for code being inserted in the receive signal based on the average power obtained by the power measurers. The estimated data rate is output to the integrator 10 and convolutional decoder 11 through the terminal 24.

Receive symbols are input at a fixed rate, for example 19.2 kbps, to the terminal 15. Here, with 1 as a sample period, the transmission encoding data rate is assumed to be one of 1, ½, ¼ or ⅛. Because of this receive symbols are input that are the same transmission code repeated twice when the data rate is ½, 4 times when the data rate is ¼ and 8 times when the data rate is 1⅛. Also, the transmission code is arranged in frames, and the length of one frame is set to N sample periods. This frame length is defined in time, and is fixed independently of the data rate. As a result, the number of codes included in one frame depends on the data rate. Namely, the number of codes included in one frame is N when the data rate is 1, N/2 when the data rate is ½, N/4 when the data rate is ¼, and N/8 when the data rate is ⅛. This effectively means that N is an integer multiple of 8.

The receive symbols supplied to terminal 15 are supplied to the first accumulator 16. This first accumulator 16 then adds each of the inputted symbols together two at a time. That is, if an input symbol is x(n)[n=1~N], the output a2(i) of the first accumulator 16 is represented by the following equation.

$$a2(i)=x(2i-1)+x(2i) \tag{4}$$

Where, [i=1~N/2]
Similarly to the first accumulator 16, the samples input to the second accumulator 17 and third accumulator 18 are added together two at a time. Namely, the outputs from each of the accumulators are represented by the following equations.

$$a3(j)=a2(2j-1)+a2(2j) \tag{5}$$

Where, [j=1~N/4]

$$a4(k)=a3(2k-1)+a3(2k) \tag{6}$$

Where, [i=1~N/8]
In this embodiment, received samples are processed for every one frame. This means that N signals are read in at the first accumulator 16 and N/2 signals are output. Similarly, N/2 signals are read in at the second accumulator 17 and N/4 signals are output, while N/4 signals are read in at the third accumulator 18 and N/8 signals are output.

The respective power measurers obtain the average power for respective one frame periods for the receive signals supplied from the terminal 15 and for the output signals supplied from the respective accumulators. The average power is actually calculated based on the following equations.

$$P5 = \frac{1}{N}\sum_{n=1}^{N} X^2(n) \tag{7}$$

$$P6 = \frac{1}{N}\sum_{i=1}^{N/2} a2^2(i) \tag{8}$$

$$P7 = \frac{1}{N}\sum_{j=1}^{N/4} a3^2(j) \tag{9}$$

$$P8 = \frac{1}{N}\sum_{k=1}^{N/8} a4^2(k) \tag{10}$$

Figure 3:
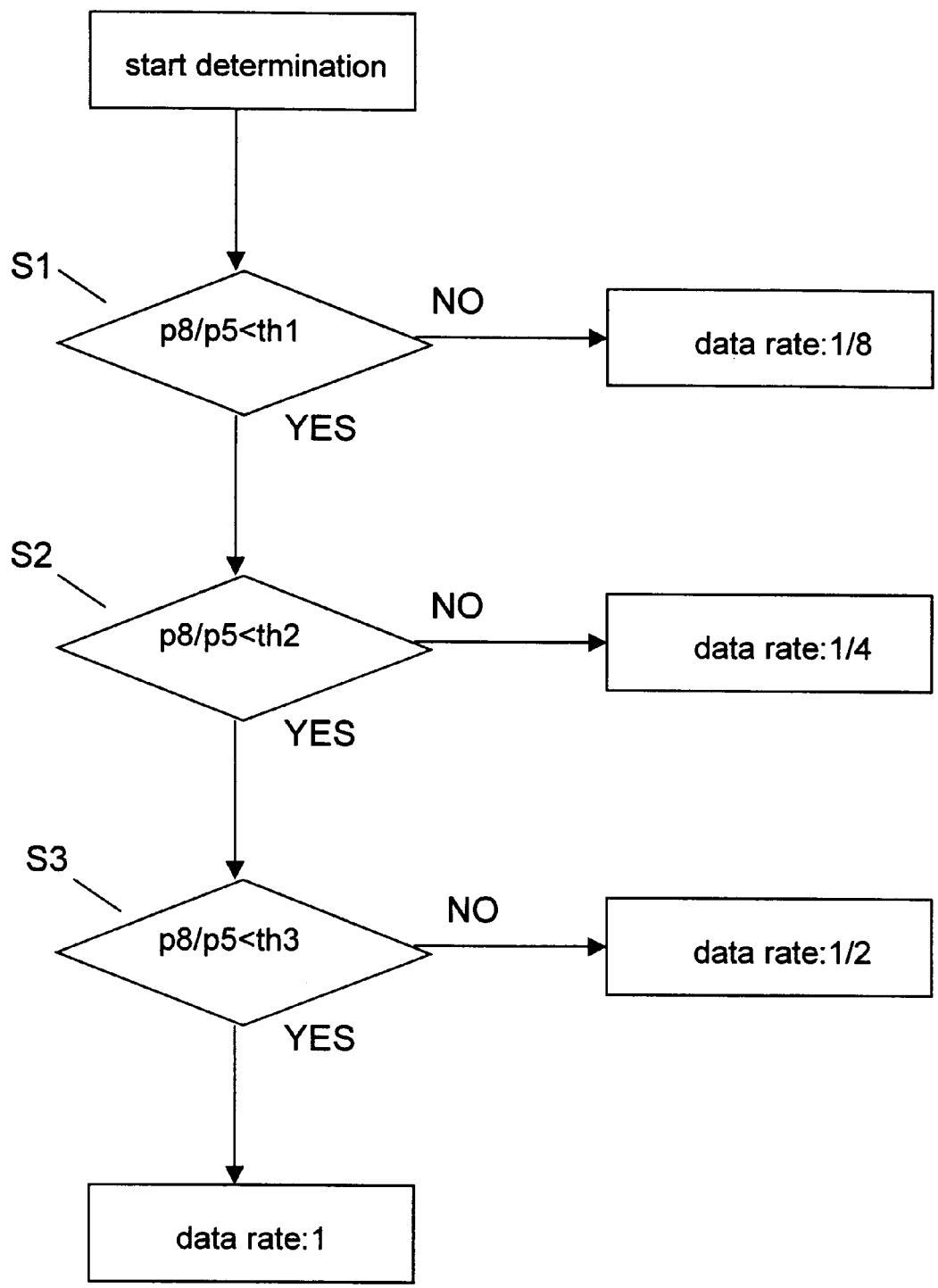
FIG. 3 is a flowchart for describing a data rate determining algorithm in a data rate determiner 23.

In the respective power measurers 19, 20, 21 and 22, the power averages for one frame period p5, p6, p7 and p8 are measured based on the above equations. These measurement results are supplied to the data rate estimator 23. The data rate estimator 23 determines the data rate based on the supplied average powers p5, p6, p7 and p8. The estimation algorithm of the data rate estimator 23 is shown in FIG. 3. Also, the relationship shown in FIG. 4 exists between each of the average powers p5, p6, p7 and p8 under ideal conditions.

The algorithm for determining the data rate in the data rate estimator 23 will be explained in detail below, with reference to FIG. 3. The data rate estimator 23 determines the data rate using the ratio of power averages p8/p5, and previously established threshold values th1, th2 and th3. In this example, the power measurers 20 and 21 in FIG. 2 can be omitted. Each of the threshold values will be explained taking th1 =3/4, th2=3/8 and th3=3/16, in consideration of the relationship shown in FIG. 4.

In step S1 in FIG. 3, the sizes of p8/p5 and threshold value th1 are judged. If p8/p5 is larger than threshold value th1, the data rate is determined as 1/8. If p8/p5 is smaller than threshold value th1, processing proceeds to step S2. In step S2 the sizes of p8/p5 and threshold value th2 are judged. If p8/p5 is larger than threshold value th2, the data rate is determined as 1/4. If p8/p5 is smaller than threshold value th2, processing proceeds to step S3. In step S3 the sizes of p8/p5 and threshold value th3 are judged. If p8/p5 is larger than threshold value th3, the data rate is determined as 1/2. If p8/p5 is smaller than threshold value th3, the data rate is determined as 1.

The term 1/N is included in all of the equations (7)~(10) mentioned above. However, as has been explained above, if judgment is carried out for the ratios of output values for each of the power measurements, 1/N can be omitted as they mutually cancel each other out. Further, if $X^2(n)$, $a2^2(i)$, $a3^2(j)$ and $a4^2(k)$ are absolute values, the square calculation can also be omitted.

In the data rate estimator 23 a separate algorithm can be used. Here, the method of estimating the data rate using the distance between the measured power series and the 4 power series shown in FIG. 4 will be explained. Specifically, the 4 distances are represented by each of the following equations.

$$d1 = \left(P6 - \frac{P5}{2}\right)^2 + \left(P7 - \frac{P5}{4}\right)^2 + \left(P8 - \frac{P5}{8}\right)^2 \tag{11}$$

$$d2 = (P6 - P5)^2 + \left(P7 - \frac{P5}{2}\right)^2 + \left(P8 - \frac{P5}{4}\right)^2 \tag{12}$$

$$d3 = (P6 - P5)^2 + (P7 - P5)^2 + \left(P8 - \frac{P5}{2}\right)^2 \tag{13}$$

$$d4 = (P6 - P5)^2 + (P7 - P5)^2 + (P8 - P5)^2 \tag{14}$$

The data rate estimator 23 calculates d1~d4 from each of the above equations, and selects the smallest value from among them. Under ideal conditions the smallest value will be 0. If the smallest value is d1 the data rate is determined as 1. If the smallest value is d2, the data rate is determined as 1/2. If the smallest value is d3, the data rate is determined as 1/4. If the smallest value is d4, the data rate is determined as 1/8.

In this way, the data rate is determined based on the power of signals passing through each band limiting means. For this reason, the data rate can be estimated without using a CRC check method or the like. In the above described FIG. 1, the functions constituting the present invention are represented as blocks, and are represented as being realized as respective individual hardware units. However, by using DSP etc., it is also possible to realize the present invention as software functions. It is also possible for the band limitation means to limit the band of the received signals. As one example, digital filters such as FIR, IIR etc. can be used.

Figure 5:
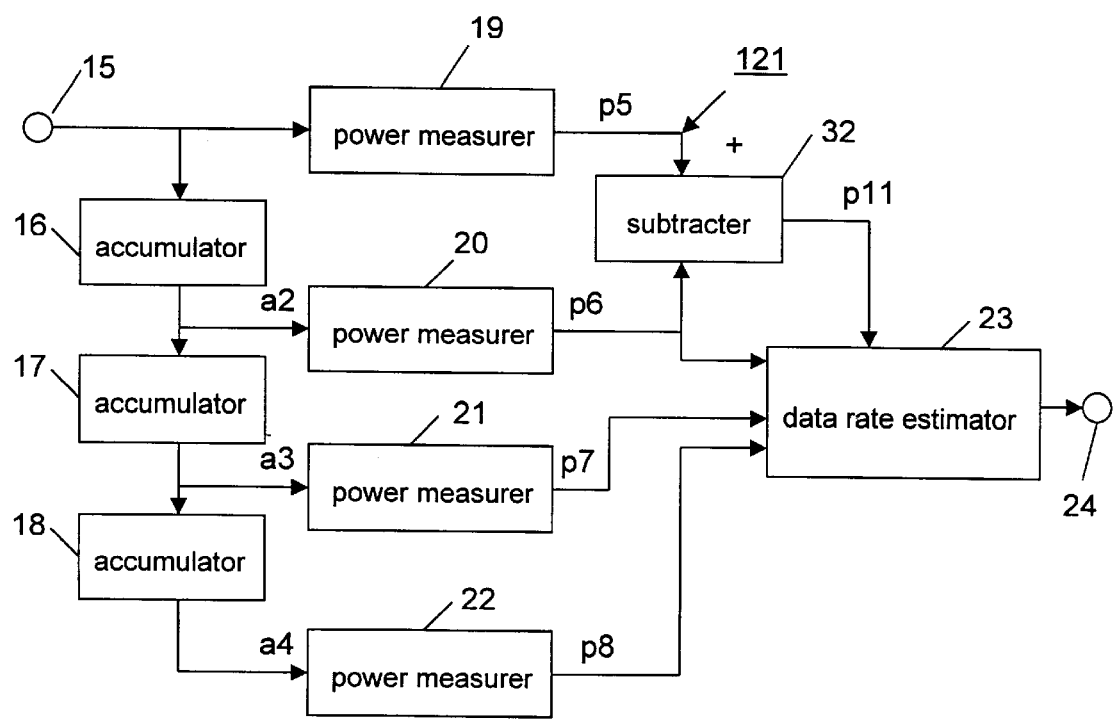
FIG. 5 is a block diagram showing the particular construction of a data rate estimator.

A block diagram illustrating a further additional composition of the data rate estimator is shown in FIG. 5. In the composition of the data rate estimator 121, parts which are similar to parts in the data rate estimator 2 shown in FIG. 2 have similar numerals affixed thereto, and the detailed description thereof will be omitted. With this composition, by estimating the power spectral density of noise the data rate is reliably estimated even when noise is contained in the received signal. Because of this, a subtractor 32 is added. The output of the first power measurer 19 is input to this subtractor 32. The output from the second power measurer 20 is input to the subtractor 32 and the data rate estimator 23. The output of the subtractor 32 is also input to the data rate estimator 23. The data rate estimator 23 estimates the data rate based on the average power obtained by the individual power measurers and the noise density (power spectral density of noise) obtained by the subtractor 32.

In the subtractor 32, the average power measured by the second power measurer 20 is subtracted from the average power measured by the first power measurer 19. This subtraction value p11 represents the noise density when the data rate is assumed as being less than 1. This value p11 is supplied to the data rate estimator 23 together with the output values of the second, third and fourth power measurers. In the data rate estimator 23, the data rate is estimated based on the respective average powers p6, p7 and p8, and the subtraction value p11. This estimation operation will be described using FIG. 6.

Figure 6:
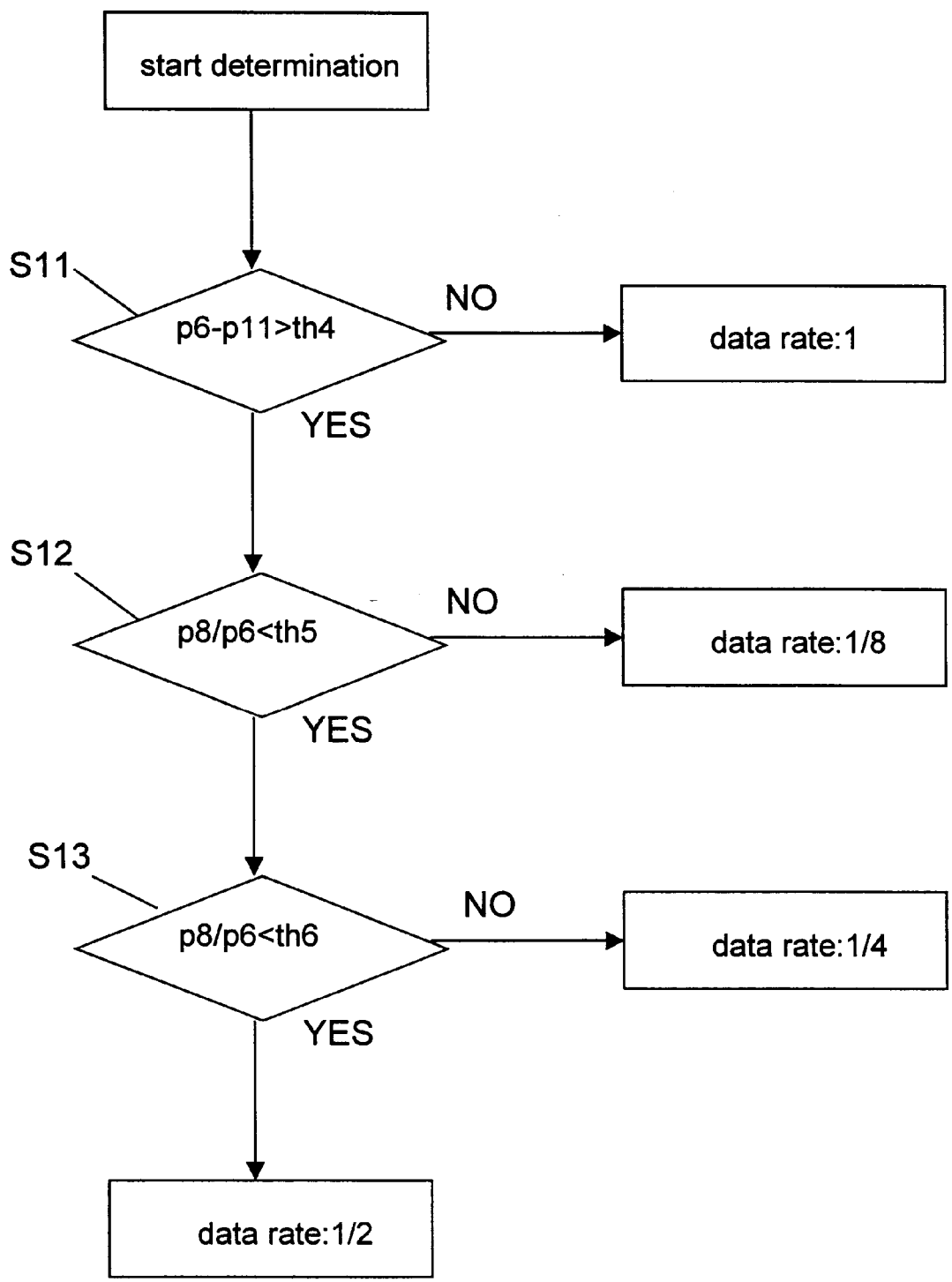
FIG. 6 is a flowchart for describing a data rate determining algorithm in a data rate determiner 123.

In the algorithm shown in FIG. 6, the data rate is determined using the noise density p11, the ratio of average powers p8/p6, and previously established threshold values th4, th5 and th6. In this example, the power measurer 21 in FIG. 5 can be omitted. Considering the relationship shown in FIG. 4, the description will be given with each of the threshold values being, for example, th4=p$\frac{5}{4}$, th5=$\frac{3}{4}$ and th6=$\frac{3}{8}$.

In step S11 of FIG. 6, the size of threshold value th4 and the result of p11 subtracted from p6 are judged. If the result of p6−p11 is smaller than threshold value th4, the data rate is judged to be 1. If the result of p6−p11 is bigger than threshold value th4, processing proceeds to step S12. In step S12, the size of p8/p6 and threshold value th5 are judged. If p8/p6 is bigger than threshold value th5, it is judged that the data rate is $\frac{1}{8}$. If p8/p6 is smaller than threshold value th5, processing proceeds to step S13. In step S13, the size of p8/p6 and threshold value th6 are judged. If p8/p6 is bigger than threshold value th6, it is judged that the data rate is $\frac{1}{4}$. If p8/p6 is smaller than threshold value th6, it is judged that the data rate is $\frac{1}{2}$.

In this way, the data rate can be correctly estimated even under conditions where white noise has been added.

Figure 7:
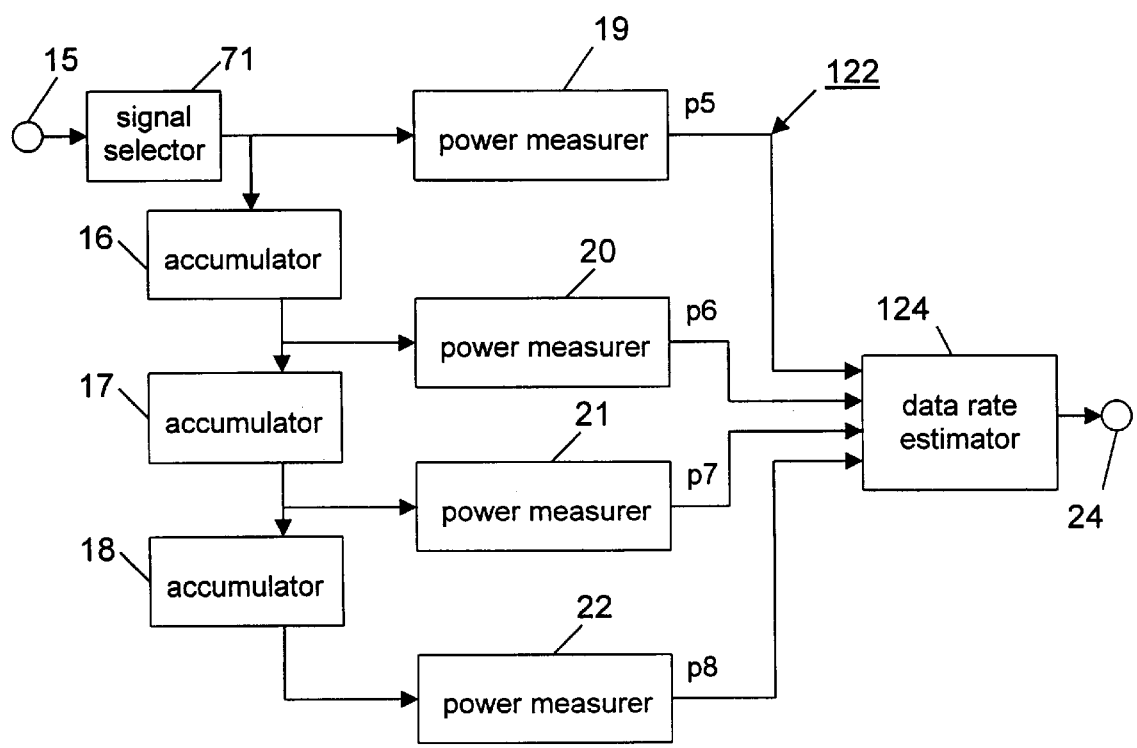
FIG. 7 is a block diagram showing a further particular construction of a data rate estimator.

Next, a further additional configuration of the data rate estimator will be described. A block diagram illustrating the composition of the data rate estimator 122 is shown in FIG. 7. Similar reference numerals are affixed to parts that are similar to those in the data rate estimator 12 shown in FIG. 2, and detailed description thereof will be omitted. This composition satisfactorily estimates the data rate, even if the receive signal does not become white. Because of this, a signal selector 71 has been added. The receive symbols input to terminal 15 are first input to the signal selector 71. The signal selector 71 supplies a valid signal from within the received signal sample to the first accumulator 16 and the power measurer 19. In a transmission selector, the signal selector 71 preferably has flip-flops and switch elements for removing power control bits from the received signal. When flip-flops are used, a clock is not input at places where power control bits within the input signal are located. The power control bits are removed in this way. Further, when switch elements are used, the switches are switched off at places where power control bits within the input signal are located, and the power control bits are removed in this way. Actually, it is difficult to specify the location of the power control bits. Accordingly, if all locations where power control bits are inserted are removed, processing is simplified.

Figure 8:
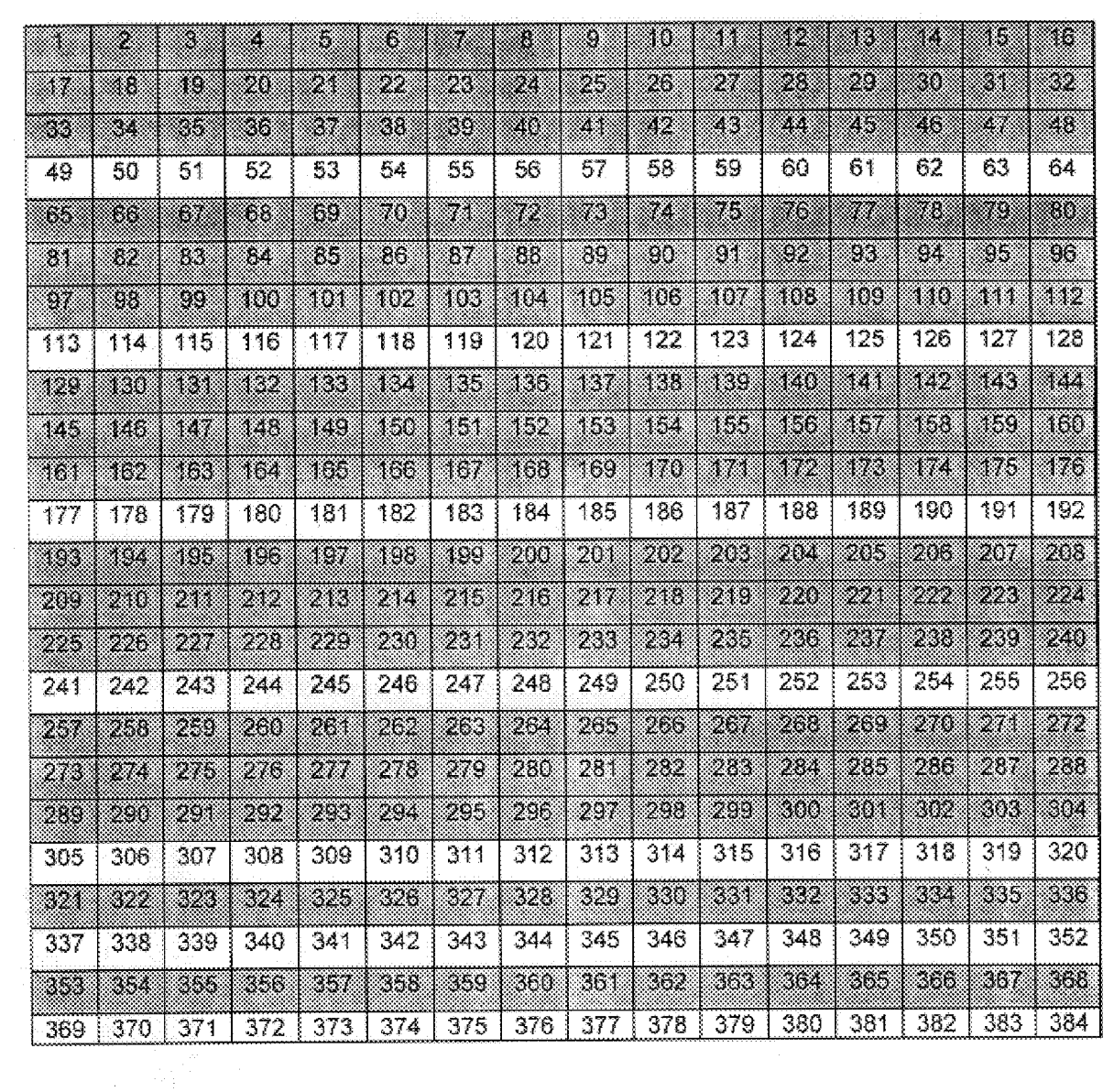

One frame of a receive signal in a CDMA system is shown in FIG. 8. As mentioned previously, one frame contains 384 symbols. In the one frame shown in FIG. 8, the hatched regions are regions where power control bits are inserted. On the other hand the unhatched regions are regions where power control bits are not inserted. Specifically, the signal selector 71 only provides the symbols in the unhatched region to the first accumulator 16 and the power measurer 19. At this time, there is no periodicity to the symbols output from the signal selector 71, and can be regarded as being within the white spectrum. The data rate is estimated by the data rate estimator 124 based on the respective average powers p5, p6, p7 and p8. This estimation operation will be described using FIG. 9.

Figure 9:
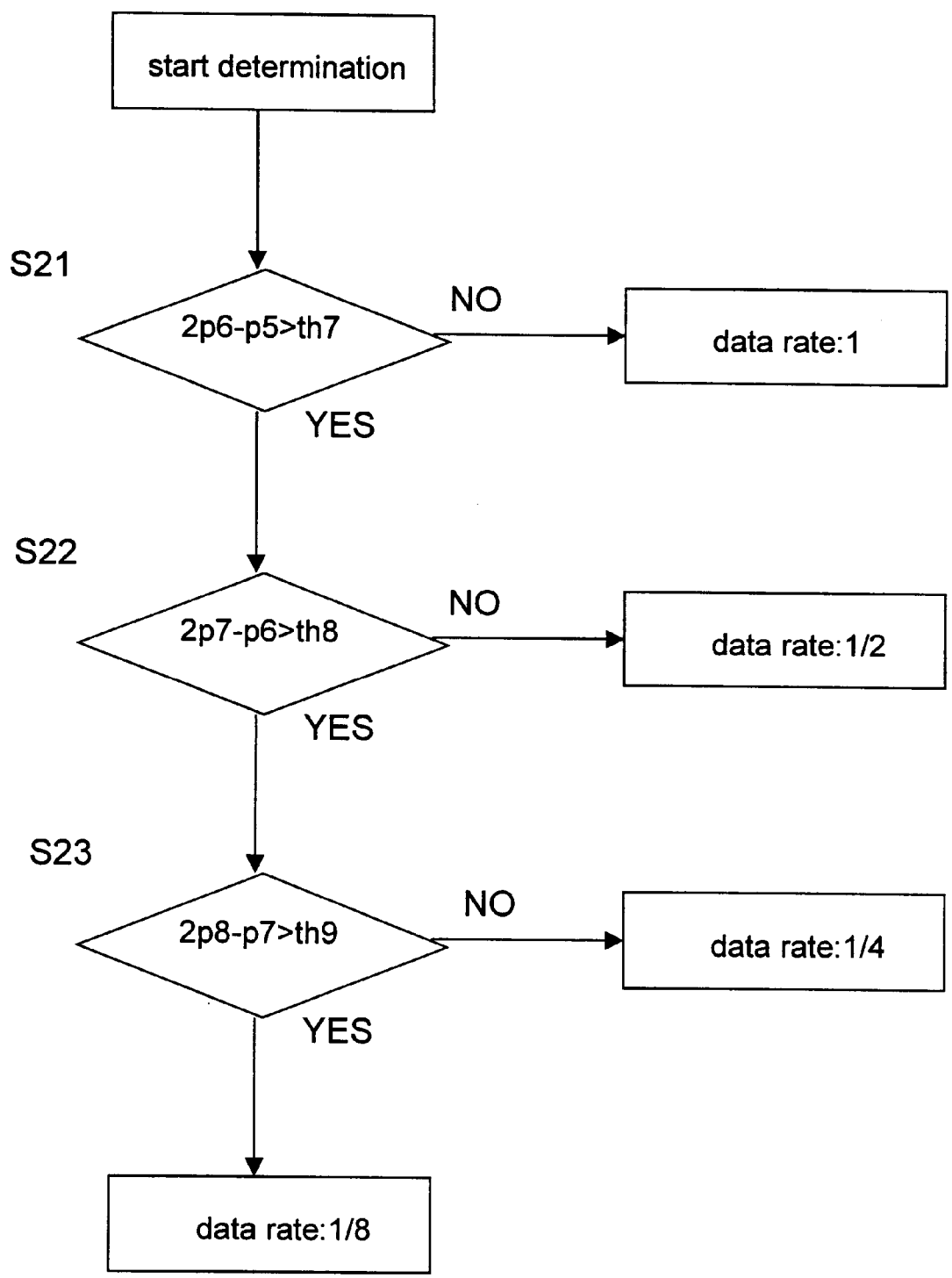
FIG. 9 is a flowchart for describing a data rate determining algorithm in a data rate determiner 124.

In the algorithm shown in FIG. 9, the data rate is determined using average powers p5, p6, p7, p8 and previously established threshold values th7, th8 and th9. The respective threshold values th7, th8 and th9 are established in the following way.

Figure 10:
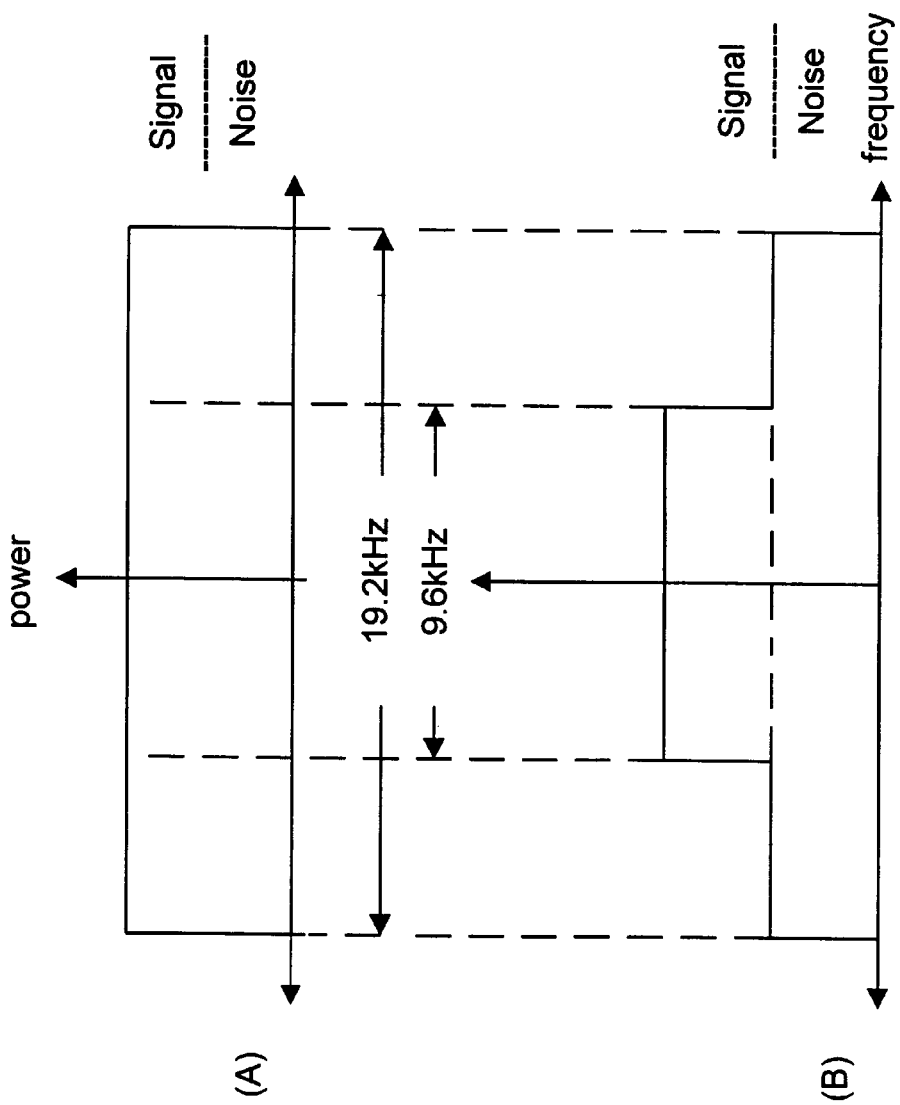
FIG. 10 is a diagram describing the spectrum of the received signal.

If the data rate is 1, the spectrum of the received waveform has a waveform as shown in FIG. 10(A), that is, the noise band and the signal band are equal. In this case, if the output p5 of the first power measurer 19 and the output p6 of the second power measurer 20 are compared with each other, p6 is approximately half p5. That is, (2p6-p5) can be regarded as approximately 0. On the other hand, if the data rate is $\frac{1}{2}$, the signal band is half the noise band. That is, the received signal spectrum has a waveform as shown in FIG. 10(B). In this case, (2p6-p5) can be regarded as the signal output when the data rate is $\frac{1}{2}$. Accordingly, ideally it can be determined that if (2p6-p5) is 0 the data rate is 1, while if (2p6-p5) is not 0 the data rate is $\frac{1}{2}$. In actual fact, however, due to the effects of transmission path noise, etc., (2p6-p5) is not 0 even when the data rate is 1. Because of this, a threshold value th7, which can clearly distinguish between a data rate of 1 and a data rate of $\frac{1}{2}$, is determined by experimentation or computer simulation. Similarly, a threshold value th8 is established to take into account (2p7-6) and a threshold value th9 is established to take into account (2p8-p7). The data rate is determined based on these threshold values.

In step S21 in FIG. 9, the size of the result of (2p6-p5) and the threshold value th7 are judged. If the result of (2p6-p5) is less than or equal to the threshold value th7, the data rate is judged to be 1. If the result of (2p6-p5) is bigger than the threshold value th7, processing proceeds to step S22. In step 22, the size of the result of (2p7-p6) and the threshold value th8 are judged. If (2p7-p6) is smaller than threshold value th8, the data rate is determined as $\frac{1}{2}$. If (2p7-p6) is larger than threshold value th8, processing proceeds to step S23. In step 23, the size of the result of (2p8-p7) and the threshold value th9 are judged. If (2p8-p7) is smaller than threshold value th9, the data rate is determined as $\frac{1}{4}$. If (2p7-p6) is bigger than threshold value th8, the data rate is determined as $\frac{1}{8}$.

In the above manner, the data rate is estimated by selecting only a valid receive signal sample using the signal selector. Because no periodicity exists in the received signal sample output from the signal selector, the received signal spectrum can be regarded as being white. For this reason, the data rate can be made very estimable. Also, because only valid receive signals are selected, a significant reduction in the amount of computation results. Explanation has been given of the removal of power control bits by the signal selector 71, but other signals can also be removed.

Figure 11:
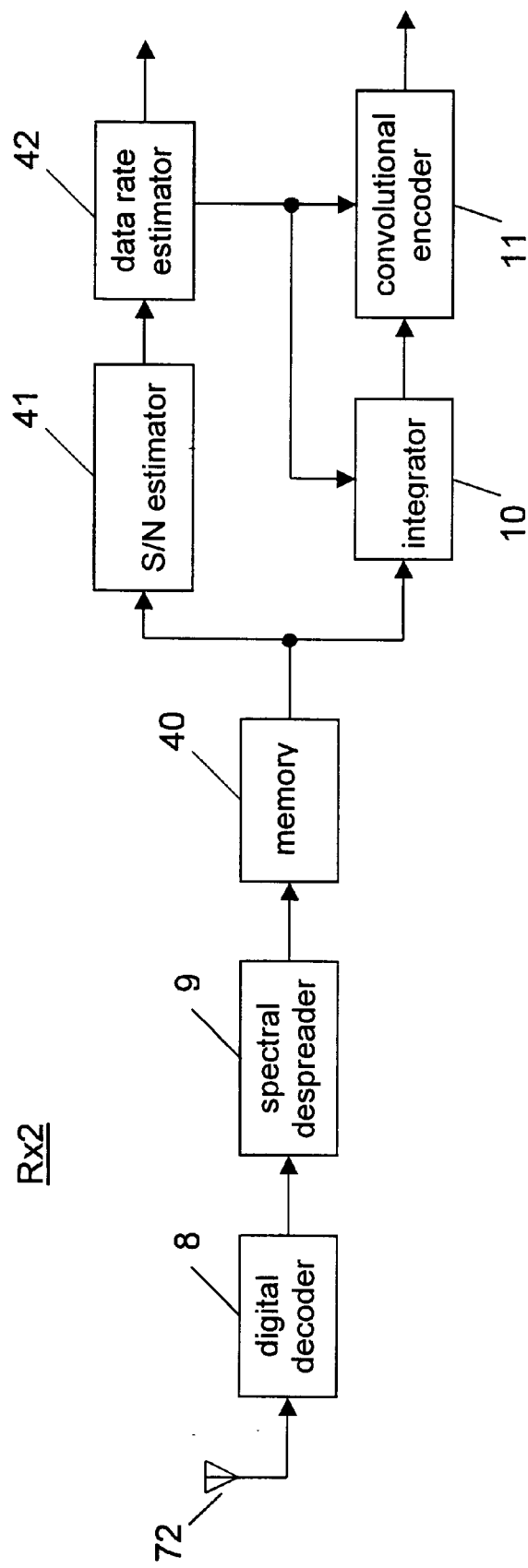
FIG. 11 is a diagram showing an embodiment of a receiver.

Another embodiment of the present invention will be explained below. The system of this embodiment is comprised of a transmitter Tx and a receiver Rx2. The composition of the transmitter Tx is the same as that shown in FIG. 1, so the explanation thereof will be omitted. Also, parts of the receiver Rx2 that are the same as parts of the receiver Rx1 have the same reference numerals affixed thereto, and the detailed description will be omitted. The composition of the receiver Rx2 will be explained below using FIG. 11.

A receive signal received by the antenna 72 is input to a digital demodulator 8. The output of the digital demodulator 8 is input to a spectral despreader 9. The output of the spectral despreader 9 comprises receive symbols at 19.2 kbps. These receive symbols are stored in a temporary memory 40. Receive symbols read out from the memory 40 are input at the same time to an integrator 10 and a S/N estimator 41 which will be described later. The S/N ratio is estimated by this S/N estimator 41 using an algorithm which will also be described later. The estimated S/N ratio is then input to the data rate estimator 42. The data rate is estimated in the data rate estimator. Processing in the integrator 10 and the convolutional decoder 11 is then carried out based on the estimated data rate.

The receive symbols input to the integrator 10 are integrated based on the data rate supplied from the data rate estimator 42, and then supplied to the convolutional decoder 11. In the convolutional decoder 11, convoluted code is decoded using a method such as Viterbi decoding, and CRC bits are also carried out. When interleaving has been carried out by the transmitter Tx, de-interleaving is carried out after back diffusion by the spectral despreader 9.

Processing carried out by the S/N estimator 41 will be described below. The SIN estimator 41 first of all respectively computes powers P21, P22, P24 and P28 contained in the 4 bands of 19.2 kHz, 9.6 kHz, 4.8 kHz and 2.4 kHz. Specifically, this is carried out according to the following equations. That is, if a signal input to the S/N estimator 41 is defined as x(n)[n=1~N], this signal has a band of 19.2 kHz. As a result, the power P21 contained in the 19.2 kHz band becomes as shown in equation (15).

$$P_{21} = \frac{1}{N} \sum_{i=1}^{N} X^2(i) \quad (15)$$

If x(n) is integrated 2 symbols at a time, this band is halved. Accordingly, the power P22 contained in the 9.6 kHz band is represented by equation (16).

$$P_{22} = \frac{2}{N} \sum_{i=1}^{N/2} \left\{ \frac{1}{2} \sum_{j=1}^{2} X(2i+j-2) \right\}^2 \quad (16)$$

Similarly, the power P24 contained in 4.8 kHz band and the power P28 contained in the 2.4 kHz band are respectively represented by equations (17) and (18).

$$P_{24} = \frac{4}{N} \sum_{i=1}^{N/4} \left\{ \frac{1}{4} \sum_{j=1}^{4} X(4i+j-4) \right\}^2 \quad (17)$$

$$P_{28} = \frac{8}{N} \sum_{i=1}^{N/8} \left\{ \frac{1}{8} \sum_{j=1}^{8} X(8i+j-8) \right\}^2 \quad (18)$$

Next, the S/N estimator 41 computes S/N ratios for the respective transmission rates based on P21, P22, P24 and P28. The S/N ratios when the data rates are assumed as ½, ¼, and ⅛ are respectively SNR2, SNR4 and SNR8, and are represented by each of the equations below.

$$SNR2 = \frac{2P_{22} - P_{21}}{P_{21} - P_{22}} \quad (19)$$

$$SNR4 = \frac{4P_{24} - P_{21}}{P_{21} - P_{24}} \quad (20)$$

$$SNR8 = \frac{8P_{28} - P_{21}}{P_{21} - P_{28}} \quad (21)$$

The S/N estimator 41 supplies the estimated S/N ratios SNR2, SNR4 and SNR8 to the data rate estimator 42.

Figure 12:
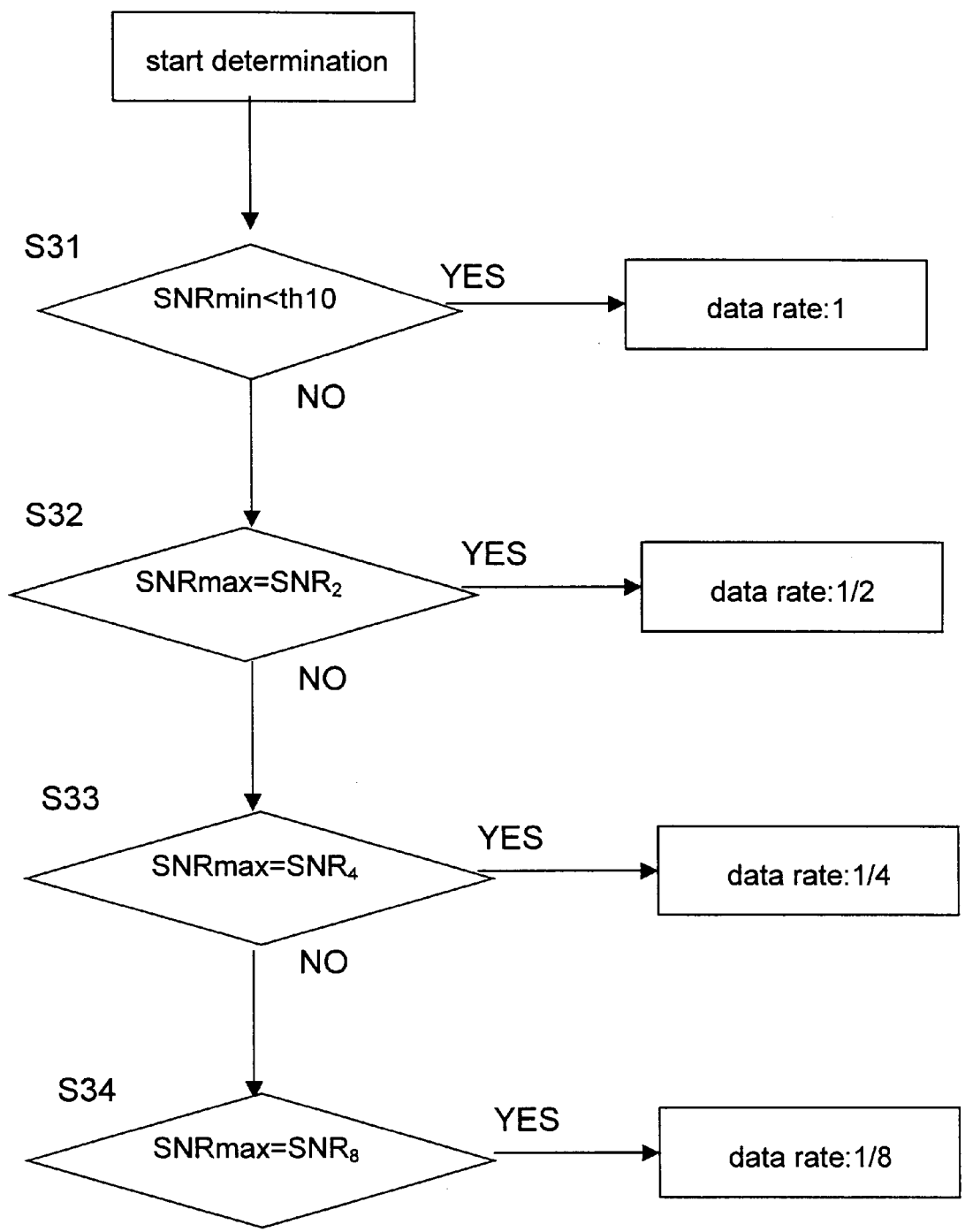
FIG. 12 is a flowchart for describing a data rate determining algorithm in the receiver Rx2.

The data rate estimator 41 estimates the data rate according to an algorithm shown in FIG. 12. Here, SNRmin and SNRmax are respectively the smallest and the largest among SNR2, SNR4 and SNR8. Also, th10 is previously established threshold value. The value of th10 is established by obtaining a value which has an extremely high probability of correctly estimating the data rate, using experimentation or computer simulation. In step S31 in FIG. 12, it is judged whether or not the smallest value of the S/N ratio is smaller than threshold value th10. If the smallest value of S/N ratio is smaller than threshold value th10, the data rate is determined as being 1. If the smallest value of S/N ratio is larger than threshold value th10, processing proceeds to step S32. In step S32, it is determined that the data rate is ½ if the maximum value of S/N ratio is equal to SNR2. Similarly, in step S33, the data rate is determined as ¼ if the maximum value of S/N ratio is equal to SNR4, and in step S34, the data rate is determined as ⅛ if the maximum value of S/N ratio is equal to SNR8.

In this way, the data rate is estimated before carrying out convolution decoding. Only the information bit sequence of the estimated data rate is decoded. As a result, it is possible to reduce the processing amount necessary for convolution decoding.

Figure 13:
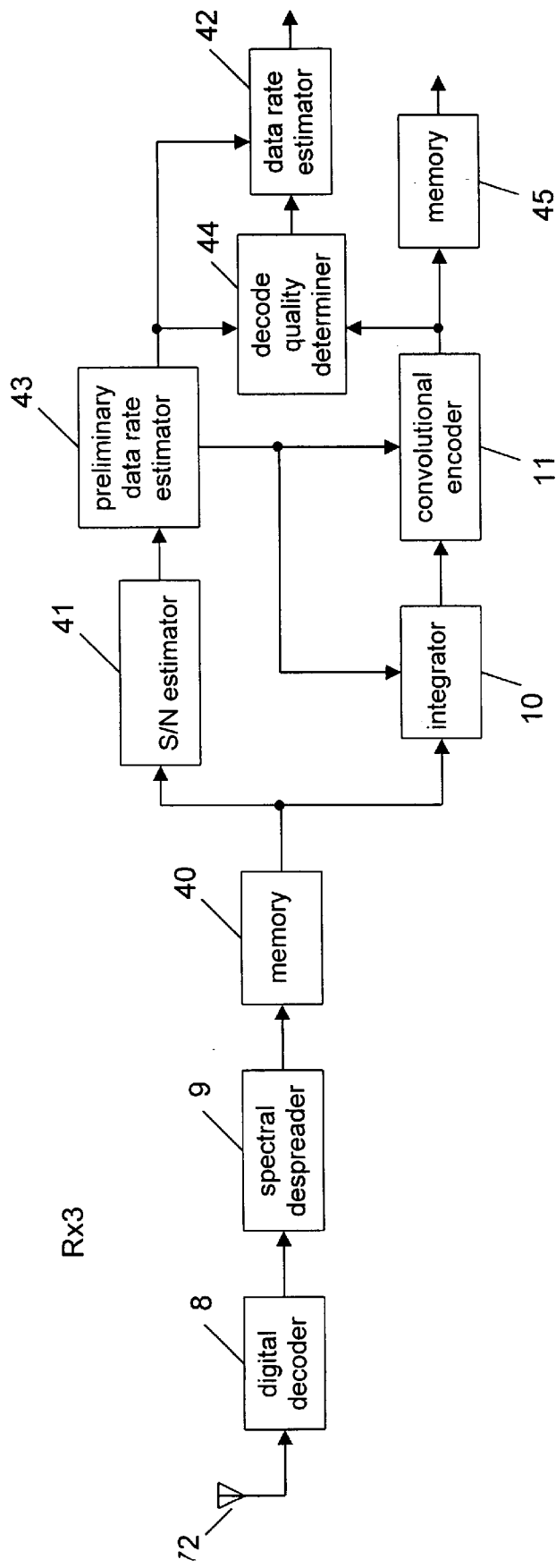
FIG. 13 is a diagram showing a further embodiment of a receiver.

A further embodiment of the receiver of the present invention is shown in FIG. 13. In the receiver Rx3, the data rate is narrowed down to a number of candidate data rates before convolution decoding so as to finally specify the data rate based on the decode quality after decoding. Namely, in FIG. 13, a preliminary data rate estimator 43 is connected to the final stage of the S/N estimator 41. The preliminary data rate estimator 43 selects and outputs a number of candidates from the transmitted data rates based on the S/N ratio estimated by the S/N estimator 41.

Figure 14:
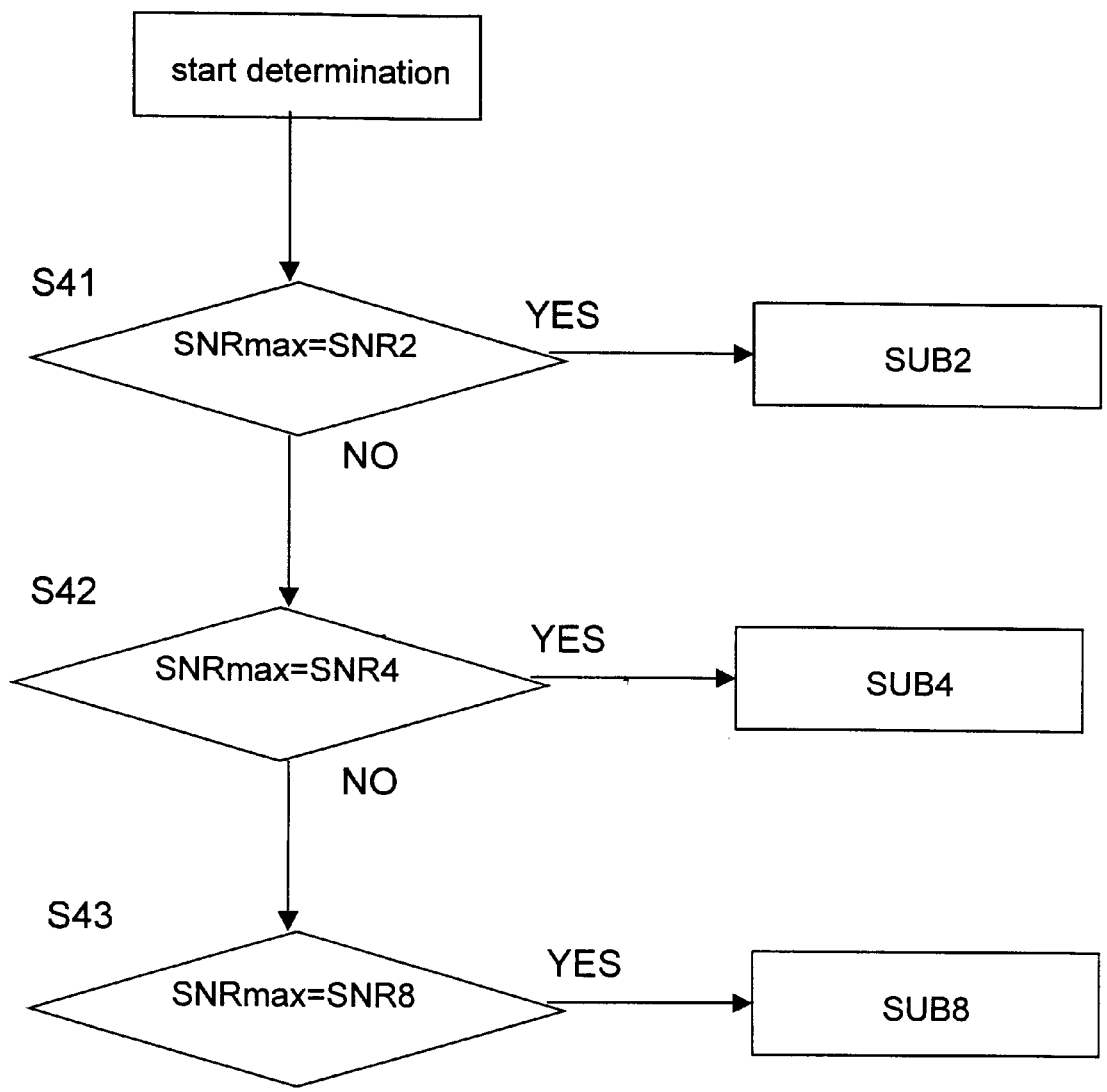
FIG. 14 is a flowchart describing a preliminarily estimated data rate determining algorithm in the receiver Rx3.

An algorithm for the processing in the preliminary data rate estimator 43 is shown in FIG. 14. In order the simplify the explanation, the preliminary data rate estimator 43 will be described as carrying out estimation from 2 data rate candidates. Further, there are three combinations of these candidates, as shown below.

(a)SUB2: data rate 1 or ½
(b)SUB4: data rate 1 or ¼
(c)SUB8 data rate 1 or ⅛

In step S41 in FIG. 14, the data rate is determined as 1 or ½ (SUB2) if the maximum value of S/N ratio is equal to SNR2. Similarly, in step S42 the data rate is determined as 1 or ¼ (SUB4) if the maximum value of S/N ratio is larger than SNR4, and in step S43 the data rate is determined as 1 or ⅛ (SUB8) if the maximum value of S/N ratio is equal to SNR8. In this way, the preliminary data rate estimator 43 does not determine the final data rate, but narrows it down to two candidates.

The candidate data rates selected and output from the preliminary data rate estimator 43 are supplied to the integrator 10, the convolutional decoder 11, a decode quality determiner 44 and the data rate estimator 42. Processing is carried out by the integrator 10 and the convolutional decoder 11 based on these estimated data rates. Accordingly, the convolutional decoder 11 supplies a number of outputs to the decode quality determiner 44. A memory 45 stores these multiple outputs. For example, if the preliminary data rate estimator 43 selects and outputs SUB2, the memory 5 stores information bits decoded assuming the data rate is 1 and stores information bits decoded assuming the data rate is ½.

The quality of the convolution decoding is determined by the decode quality determiner 44 based on the information bits after convolution decoding. In order to determine the decode quality is determined by carrying out a CRC check, etc. In the CDMA system, CRC bits are added for information bits at a data rate of 1 and ½. However, CRC bits are not added for information bits of data rate ¼ and ⅛. In this case, it is possible to determine the decode quality based on a final metric at the time of Viterbi decoding, and to use this in place of an error detection result. It is also possible to determine the decode quality by convolution coding the information bits again and comparing this with the symbols before decoding. Alternatively, these methods can be combined. What is most important is that the quality of the decoded information bits is determined. As has been described, a plurality of data rates are input to the decode quality determiner 44. Accordingly, the decode quality determiner 44 respectively determines the decode quality of these data rates.

The determination results of the decode quality determiner 44 are output to the data rate estimator 42. The data rate is determined in the data rate estimator 42 based on the data rate candidates estimated by the preliminary data rate estimator 43 and the quality of the convolution decoding determined by the decode quality determiner 44. Here, the decode quality corresponding to a data rate of 1 is Q1, the decode quality corresponding to a data rate of ½ is Q2, the decode quality corresponding to a data rate of ¼ is Q4, and the decode quality corresponding to a data rate of ⅛ is Q8. Further, it is determined whether the respective decode qualities are 'GOOD' or 'BAD'.

Figure 15:
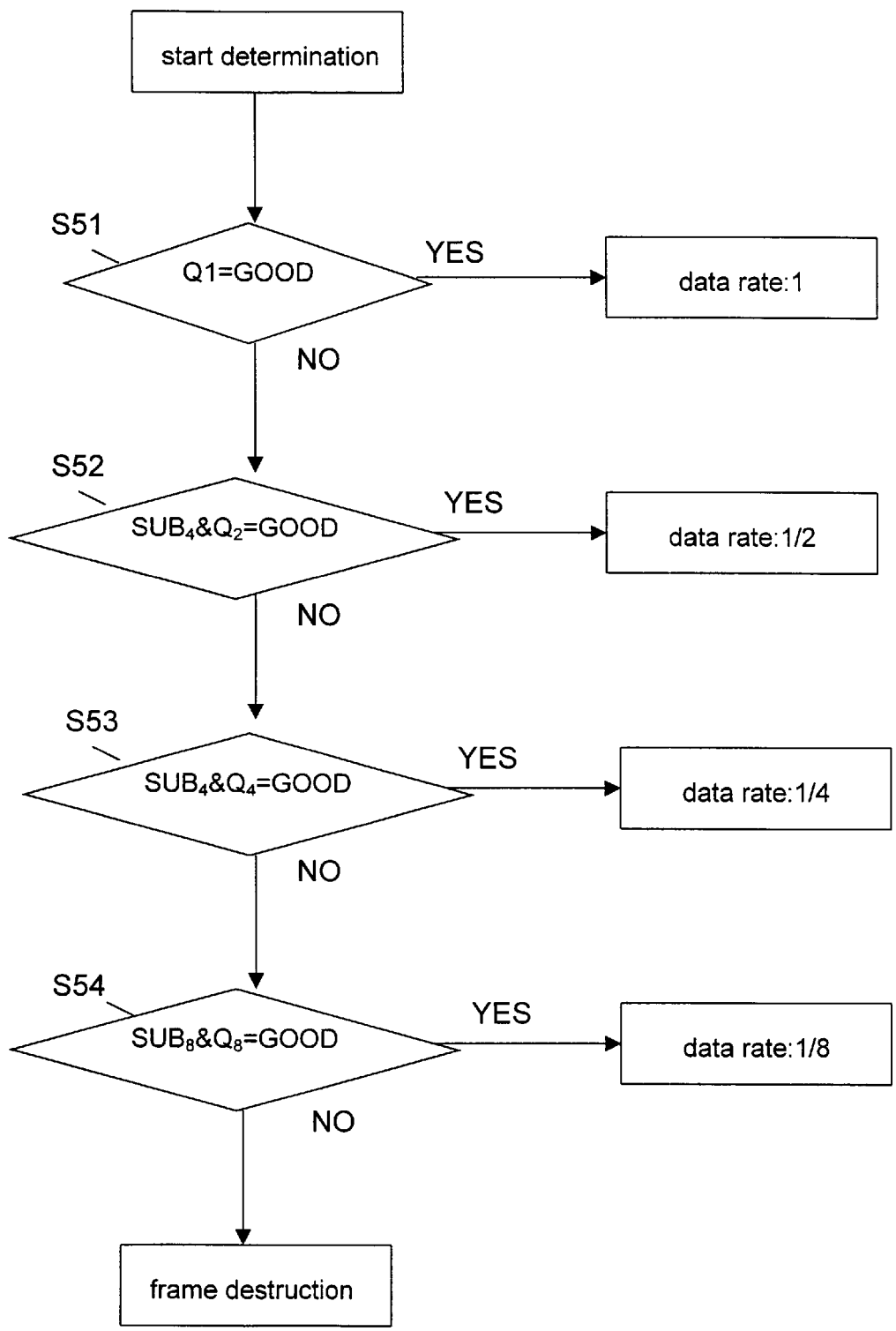
FIG. 15 is a flowchart describing a data rate determining algorithm in the receiver Rx3.

The data rate estimator 42 carries out estimation of the data rate based on an algorithm shown in FIG. 15. In step S51 in FIG. 15, the data rate is determined as 1 if the decode quality Q1 is determined as 'GOOD'. IN step S52, the preliminary data rate estimator 43 selects and outputs SUB2, and the data rate is determined as ½ if the decode quality Q2 is determined as 'GOOD'. The data rate of ¼ or ⅛ is similarly determined. If the decode quality is not determined as being 'GOOD' in any case, that frame is judged as having been lost.

The information bits corresponding to the final data rate determined by the data rate estimator 42 is then output from the memory 45. In this way, the data rate is preliminarily estimated before carrying out convolution decoding and the data rate is determined by enhancing the decode quality determined after decoding. As result of this, the precision of estimating the data rate can be made better than that in the receiver shown in FIG. 11. Further, by only convolution coding the preliminarily estimated data rate candidates, the processing necessary for convolution coding can be reduced.

Figure 16:
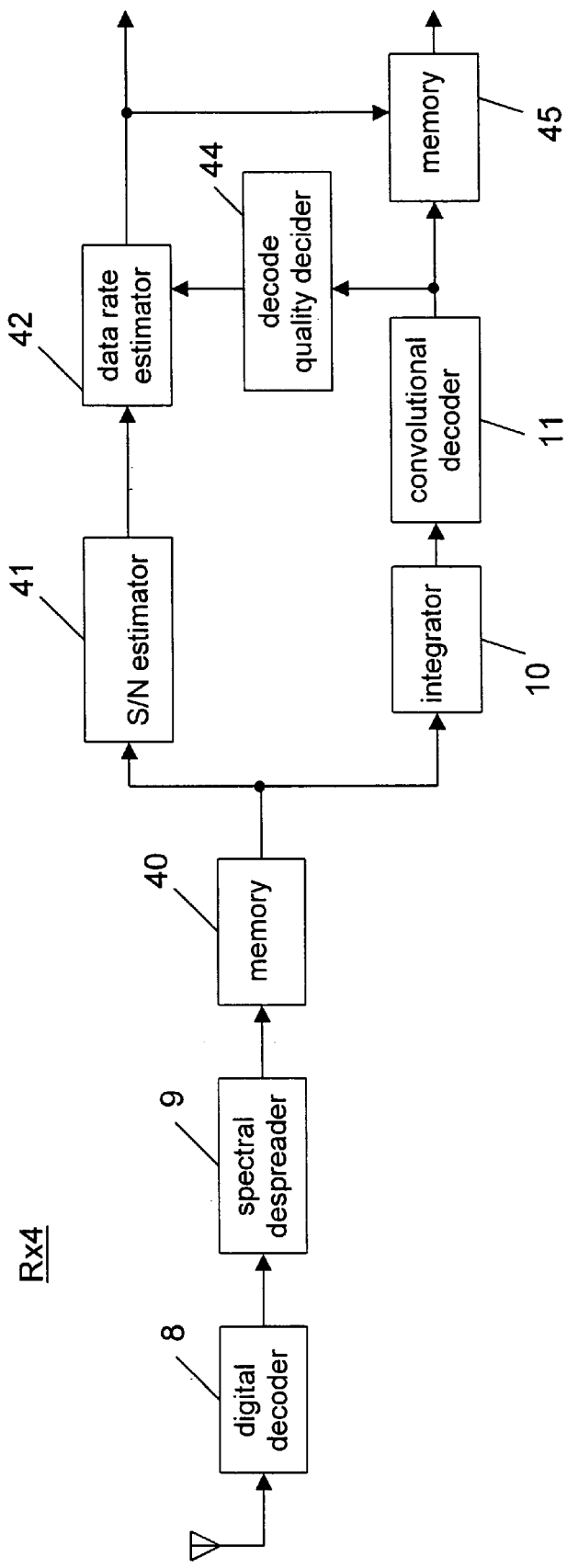
FIG. 16 is a diagram showing a further embodiment of a receiver.

Another form of the receiver of the present invention is shown in FIG. 16. In this receiver Rx4 the data rate is not estimated before convolution decoding but the data rate is estimated based on the decode quality and the S/N ratio after decoding.

In this receiver Rx4, the output of the memory 40 is supplied to the S/N estimator 41 and the integrator 10. The output of the integrator 10 is supplied to the convolutional decoder 11. The output of the convolutional decoder 11 and the output of the S/N estimator 41 are supplied to the data rate estimator 42.

The integrator 10 and the convolutional decoder 11 carry out the processing for all of the predicted data rates. The decoded information bits are then output to the data rate estimator 42 and stored in the memory 45. That is, the memory 45 holds information bits for all cases when the data rate is assumed to be 1, ½, ¼ and ⅛. Here, the decode quality for decoding assuming a data rate of 1 is defined as Q1, the decode quality for decoding assuming a data rate of ½ is defined as Q2, and similarly the decode quality for decoding assuming a data rate of ¼ is defined as Q4, and the decode quality for decoding assuming a data rate of ⅛ is defined as Q8.

The decode quality determiner 44 estimates the decode qualities Q1, Q2, Q4 Q8 respectively relating to the decoded information bits. The determination result is then output to the data rate estimator 42. The data rate estimator 42 estimates the data rate based on the signal to noise ratio estimated by the S/N estimator 41 and the decode quality determination result determined by the decode quality determiner 44. Following that, information bits complying with this estimated data rate are output from the memory 45.

Figure 17:
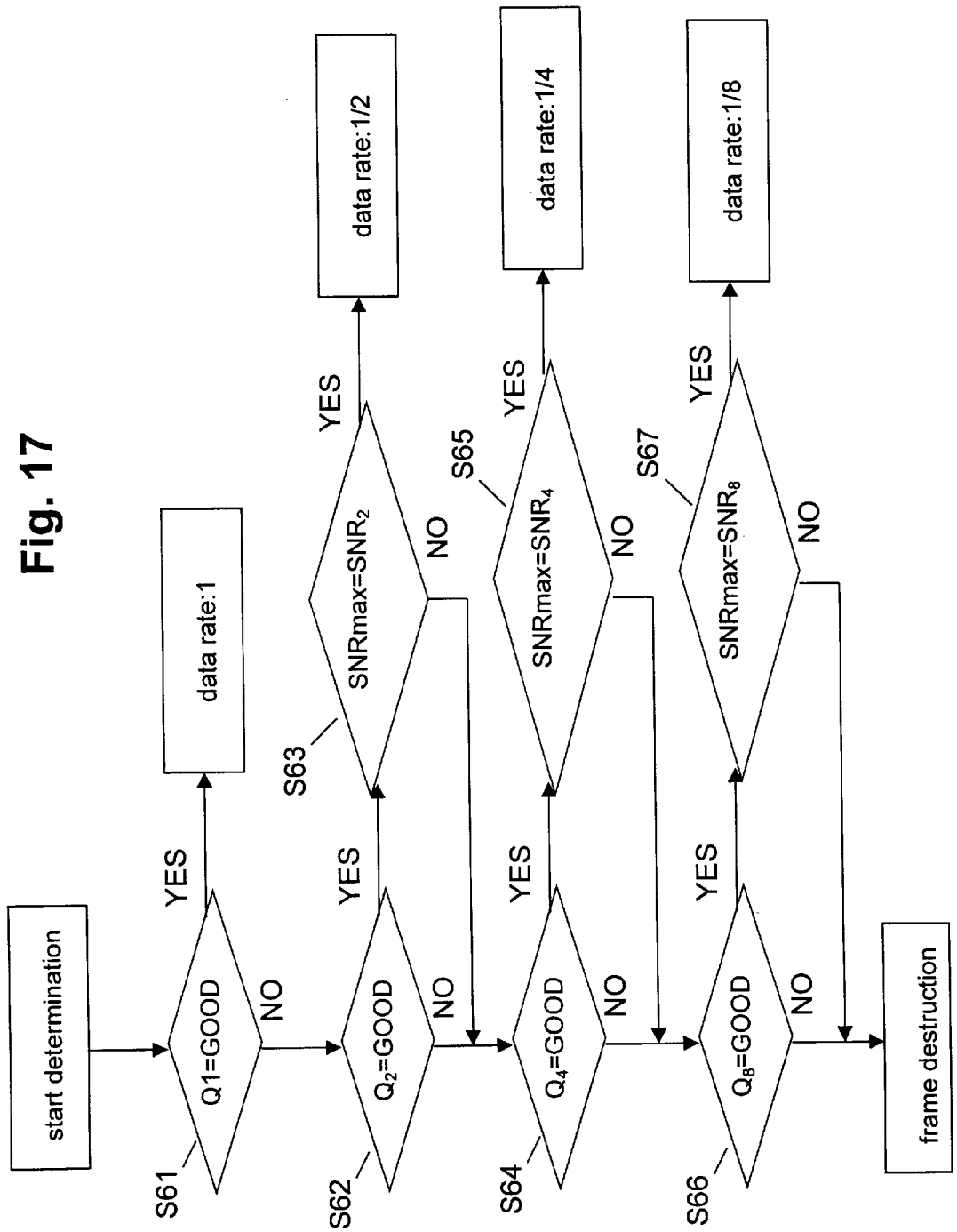
FIG. 17 is a flowchart describing a data rate determining algorithm in the receiver Rx4.

Processing carried out for the data rate estimator 42 is shown in FIG. 17. In step S61, if the decode quality Q1 is determined as 'GOOD', the data rate is determined as 1. In step S62, it is judged whether or not the decode quality Q2 is 'GOOD'. If the decode quality Q2 is 'GOOD' processing proceeds to step S63, while if the decode quality Q2 is not 'GOOD' processing proceeds to step S64. In step S63, if SNRmax is judged as being equal to SNR2, the data rate is determined as ½. If SNRmax is different from SNR2, processing proceeds to step S64.

In step S64, it is judged whether or not the decode quality Q4 is 'GOOD'. If the decode quality Q4 is 'GOOD' processing proceeds to step S65, while if the decode quality Q4 is not 'GOOD' processing proceeds to step S66. In step S65, if SNRmax is judged as being equal to SNR4, the data rate is determined as ¼. If SNRmax is different from SNR4, processing proceeds to step S66.

In step S66, it is judged whether or not the decode quality Q8 is 'GOOD'. If the decode quality Q8 is 'GOOD' processing proceeds to step S67. In step S67, if SNRmax is judged as being equal to SNR8, the data rate is determined as ⅛. If the decode quality is not 'GOOD' in step S66, or if SNRmax is different from SNR8 in step S67, that frame is judged as having been lost.

In this way, the data rate is estimated based on both the S/N ratio of the received symbols and the decode quality of the convolution decoding. This means that the credibility of the data rate estimation can be improved compared to the case where the data rate is estimated based on only the decode quality.

What is claimed is:

1. A transmission data rate estimating apparatus, comprising:

accumulator means for providing at least one band restriction indication based on a received signal;

power measuring means for obtaining average power according to the band restriction indication;

data rate estimating means for estimating a transmission data rate of the received signal, according to the average power; and a signal selector means for receiving input symbols and selecting a valid signal from among the input symbols, for provision to the accumulator means as the received signal.

2. A variable data rate communication system comprising a transmitter for generating a digital variable data stream and a receiver, the receiver comprising:

a preliminary estimating means for preliminarily selecting at least one set of candidate data rates;

a decode quality deciding means for evaluating decoding qualities according to the candidate data rates; and a data rate estimating means for deciding a transmission data rate, according to the candidate data rates and the decoding qualities.

3. A variable data rate communication system comprising a transmitter for generating a digital variable data stream and a receiver, the receiver comprising:

a S/N ratio estimator for estimating a S/N ratio of a received signal about each of the variable data rates;

a decode quality deciding means for evaluating decoding qualities according to the variable data rates; and a data rate estimating means for deciding a transmission data rate, according to the S/N ratio and the decoding qualities.

* * * * *